ABBVIE EX. 1033
Page 0001

United States Patent Office 2,959,612
Patented Nov. 8, 1960

2,959,612
DIALKYLAMINOALKYL 3,4-DIHALOCAR-BANILATES

David J. Beaver, Richmond Heights, and Paul J. Stoffel, St. Louis, Mo., assignors to Monsanto Chemical Company, St. Louis, Mo., a corporation of Delaware No Drawing. Filed Feb. 26, 1959, Ser. No. 795,622

8 Claims. (Cl. 260—472)

This invention relates to a new class of chemical compounds and to the method of preparing the same. More particularly this invention relates to compounds of the structure

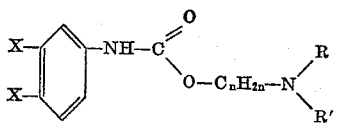

where X is a member selected from the group consisting of chlorine and bromine, n is an integer from 2 to 3, R is an alkyl radical having from 1 to 8 carbon atoms, and R' is an alkyl radical having from 1 to 8 carbon atoms. These new compounds are useful as bacteriostats and may be prepared by reacting 3,4-dihalophenylisocyanate with an alcohol of the structure

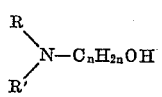

where n is an integer from 2 to 3, R is an alkyl radical having from 1 to 8 carbon atoms, and R' is an alkyl radical having from 1 to 8 carbon atoms. The interaction of the 3,4-dihalophenylisocyanate with the alkyl amino alcohol takes place readily within a temperature range of 20° to the reflux temperature of the system reaching a maximum of about 100° C. with the reaction completed in ten minutes to 2 hours. In some instances the reaction is so exothermic that it is found desirable to use some diluent like ether, benzene, petroleum ether, and the like to decrease the rate of reaction.

As illustrative of the preparation of the new compounds are the following:

EXAMPLE I

*2-dimethylaminoethyl 3,4-dichlorocarbanilate*

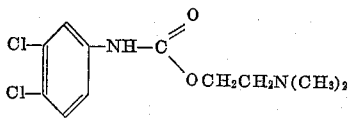

To a suitable reaction vessel there is added 18.8 g. (0.1 mole) of 3,4-dichlorophenylisocyanate and 8.9 g. (0.1 mole) of 2-dimethylaminoethanol. An exothermic reaction occurs in which the temperature rises to 90–100° C. and results in the formation of a viscous yellow oil after 10 minutes. While still hot the oil is poured into 100 ml. of heptane. On cooling the product crystallizes out as small white plates of 2-dimethylaminoethyl 3,4-dichlorocarbanilate melting at 78.2–79.0° C. (Yield: 76.4% of theory. Analysis: Calculated for Cl—25.42%; found—25.63%.)

EXAMPLE II

*2-dimethylamino-1-methylethyl 3,4-dichlorocarbanilate*

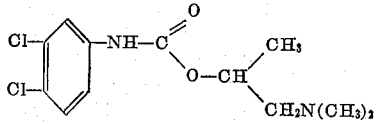

Employing the same procedure as Example I but using 10.3 g. (0.1 mole) of 1-dimethylamino-2-propanol as the alcohol, there are obtained white plates of 2-dimethylamino-1-methylethyl 3,4-dichlorocarbanilate melting at 98.7–99.6° C. (Yield: 69.5% of theory. Analysis: Calculated for Cl—24.37%; found—24.25%.)

EXAMPLE III

*2-diethylaminoethyl 3,4-dichlorocarbanilate*

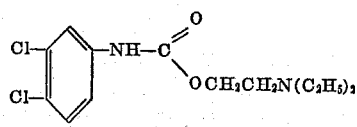

A solution of 18.8 g. (0.1 mole) of 3,4-dichlorophenylisocyanate is added with stirring to 11.7 g. (0.1 mole) of 2-diethylaminoethanol in 50 ml. of ether. A strong exothermic reaction results which causes the ether to reflux during the above addition step. After one hour the ether is removed under vacuum distillation leaving 2-diethylaminoethyl 3,4-dichlorocarbanilate as a yellowish oil. (Yield: 95.0% of theory. Analysis: Calculated for Cl—23.25%; found—23.21%.)

EXAMPLE IV

*3-dibutylaminopropyl 3,4-dichlorocarbanilate*

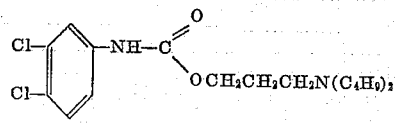

Employing the same procedure as Example III but using 18.7 g. (0.1 mole) of 3-dibutylaminopropanol as the alcohol, there is obtained 3-dibutylaminopropyl 3,4-dichlorocarbanilate as a brown syrup. (Yield: 95.1% of theory. Analysis: Calculated for Cl—18.95%; found—18.54%.)

EXAMPLE V

*3-diethylaminopropyl 3,4-dichlorocarbanilate*

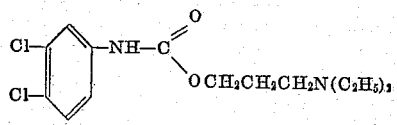

Employing the same procedure as Example III but using 13.1 g. (0.1 mole) of 3-diethylaminopropanol as the alcohol, there is obtained 3-diethylaminopropyl 3,4-dichlorocarbanilate as a yellow sprup. (Yield: 97.1% of theory. Analysis: Calculated for Cl—22.22%; found—22.45%.)

EXAMPLE VI

*2-dimethylaminoethyl 3,4-dibromocarbanilate*

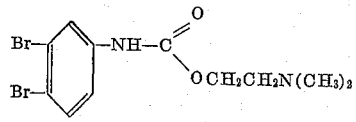

By utilizing the same procedure as set forth in Example I above but substituting 27.7 g. (0.1 mole) of 3,4-dibromophenylisocyanate for the 3,4-dichlorophenylisocyanate, there is obtained a good yield of 2-dimethylaminoethyl 3,4-dibromocarbanilate.

The above examples are merely represnetative and other compounds which may be prepared by reacting 3,4-dichlorophenylisocyanate or 3,4-dibromophenylisocyanate with the appropriate alkyl amino alcohol include:

3-diheptylaminopropyl 3,4-dibromocarbanilate,
2-dibutylaminoethyl 3,4-dichlorocarbanilate,
3-dioctylaminopropyl 3,4-dichlorocarbanilate,
3-diamylaminopropyl 3,4-dibromocarbanilate,
2-dihexylaminoethyl 3,4-dichlorocarbanilate,
3-diamylaminopropyl 3,4-dichlorocarbanilate,
2-dipropylaminoethyl 3,4-dibromocarbanilate,
and the like.

Although the compounds of this invention contemplate a dialkylamino radical containing 8 carbon atoms, the preferred group includes only those dialkylamino radicals having 1 to 4 carbon atoms like Exampes I and III above.

The new compounds of this invention have been found to exhibit outstanding bacteriostatic or antiseptic properties as evidenced by the following procedure which measures the ability of these compounds to inhibit the multiplication of *Micrococcus pyogenes* var. *aureus* (MPA). Multifold serial dilutions of each of the compounds tested ranging from 1:1000 to 1:50 million were prepared in a nutrient sterilized agar. The agar in each case was then poured into a Petri dish, allowed to harden, and then inoculated with a standard culture of MPA. The inoculation in each instance was for 48 hours at 37° C. The extent of growth is set forth in the table below:

TABLE I

| Compound | Concentration, one part per— | | | | | |
|---|---|---|---|---|---|---|
| | 1T | 10T | 100T | 1M | 10M | 50M |
| 2-dimethylaminoethyl 3,4-dichlorocarbanilate | − | − | − | − | − | − |
| 2-diethylaminoethyl 3,4-dichlorocarbanilate | − | − | − | − | + | |
| 3-diethylaminopropyl 3,4-dichlorocarbanilate | − | − | − | − | + | |

Legend: −=no growth; +=growth; T=thousand; M=million.

In view of the strong bactericidal properties exhibited by these new compounds, they may be used wherever a bactericidal effect is desired. Accordingly the compounds of this invention may be formulated with other compositions such as soaps, detergents, cosmetic preparations, tooth pastes, mouth lotions, and the like. However, the compounds of this invention need not be combined with other materials, but it will be apparent that solutions or dispersions of the new compounds of this invention may be prepared for use on the human skin and for treatment of fabrics, plastics, wooden articles, and metallic materials or wherever it is desired to prevent bacterial growth. Moreover, it is evident that due to their high bactericidal activity, these new compounds will prove effective in solutions or dispersions containing as little as 0.000002% to 0.001%. From a practical standpoint concentrates containing up to 100% of the new compounds may be prepared such that the user by merely mixing the concentrate with an appropriate diluent or solvent will be able to prepare an efficacious bactericidal solution of dispersion of these new compounds.

The above description and examples are intended to be illustrative only. Any modification thereof which conforms to the spirit of the invention is considered to be within the scope of the claims.

What is claimed is:
1. Compounds of the structure

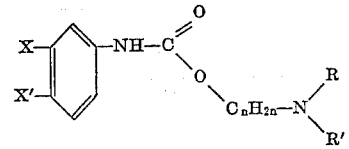

where X and X' are each a halogen selected from the group consisting of bromine and chlorine, $n$ is an integer from 2 to 3, R is an alkyl radical having from 1 to 8 carbon atoms, and R' is an alkyl radical having from 1 to 8 carbon atoms.

2. Compounds of the structure

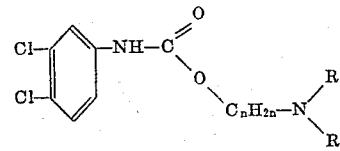

where $n$ is an integer from 2 to 3, R is an alkyl radical having from 1 to 8 carbon atoms, and R' is an alkyl radical having from 1 to 8 carbon atoms.

3. Compounds of the structure

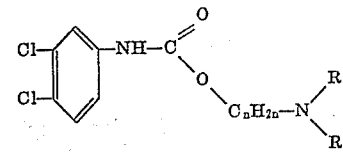

where $n$ is an integer from 2 to 3, R is an alkyl radical having from 1 to 4 carbon atoms, and R' is an alkyl radical having from 1 to 4 carbon atoms.

4. 2-dimethylaminoethyl 3,4-dichlorocarbanilate.
5. 2-diethylaminoethyl 3,4-dichlorocarbanilate.
6. 3-diethylaminopropyl 3,4-dichlorocarbanilate.
7. 2-dimethylamino-1-methylethyl 3,4-dichlorocarbanilate.
8. 2-dibutylaminoethyl 3,4-dichlorocarbanilate.

References Cited in the file of this patent

UNITED STATES PATENTS

| 2,033,740 | Rider | Mar. 10, 1936 |
| 2,109,492 | Lott et al. | Mar. 1, 1938 |
| 2,409,001 | Shelton et al. | Oct. 8, 1946 |